United States Patent
Finkelshtein

(10) Patent No.: US 7,887,776 B2
(45) Date of Patent: Feb. 15, 2011

(54) CHEMICAL PROCESS TO PRODUCE HYDROGEN CHLORIDE AND CHLORIDE-FREE COMPOUND POTASSIUM SULFATE FERTILIZERS OR OTHER METAL SULFATES

(76) Inventor: Leonid Finkelshtein, Hahashmonaim 12/122, 26401 Kiryat Motzkin (IL)

( * ) Notice: Subject to any disclaimer, the term of this patent is extended or adjusted under 35 U.S.C. 154(b) by 0 days.

(21) Appl. No.: 12/524,160

(22) PCT Filed: Jun. 15, 2008

(86) PCT No.: PCT/IL2008/000813
§ 371 (c)(1),
(2), (4) Date: Jul. 23, 2009

(87) PCT Pub. No.: WO2009/013728
PCT Pub. Date: Jan. 29, 2009

(65) Prior Publication Data
US 2010/0111819 A1      May 6, 2010

Related U.S. Application Data

(60) Provisional application No. 60/951,762, filed on Jul. 25, 2007.

(51) Int. Cl.
*C01B 7/01* (2006.01)
*C01B 17/96* (2006.01)
*C01D 5/00* (2006.01)

(52) U.S. Cl. .................. 423/482; 423/544; 423/551; 423/554; 71/63

(58) Field of Classification Search .............. 423/482, 423/544, 551, 554; 71/63
See application file for complete search history.

(56) References Cited

U.S. PATENT DOCUMENTS 2,094,573 A     9/1937  Jacobi (Continued)

FOREIGN PATENT DOCUMENTS

EP        0100783 A1    2/1984

(Continued)

OTHER PUBLICATIONS

"Picromerite", 2001, Mineral Data Publishing, XP 002498872, retreived from the internet: http://www.handbookofmineralogy.org/pdfs/picromerite.pdf, Oct. 8, 2008.

(Continued)

*Primary Examiner*—Timothy C Vanoy
(74) *Attorney, Agent, or Firm*—Daniel J. Feigelson

(57) ABSTRACT

A method is disclosed for production of a sulfate-containing chlorine free salt and anhydrous gaseous HCl from a metal chloride ($MCl_x$), oleum and water. $MCl_x$ and oleum are mixed together with a water-containing liquid, forming gaseous HCl and a solution of a sulfate-containing salt. The salt is precipitated from the solution, and in a preferred embodiment, the supernatant liquid from the precipitation is recycled to the reaction mixture as the water-containing liquid in subsequent reaction cycles. The exothermicity of the reaction between the water-containing liquid and the oleum is sufficient to remove chlorine in the form of substantially pure useful HCl and enables the process to proceed without additional heating of the reaction mixture. When the metal is potassium, this method produces high-purity novel sulfate salts with high potassium content $K_3(NH_4)(SO_4)_2$, $3K_2SO_4 \cdot MgSO_4$ and $3K_2SO_4 \cdot Ca_n Mg_{1-n} SO_4$.

20 Claims, 3 Drawing Sheets

U.S. PATENT DOCUMENTS

| | | | |
|---|---|---|---|
| 4,045,543 A | | 8/1977 | Sardisco |
| 4,342,737 A | | 8/1982 | Iwashita et al. |
| 4,349,525 A | * | 9/1982 | Yamashita et al. .......... 423/488 |
| 4,420,468 A | * | 12/1983 | Yamashita et al. .......... 423/482 |
| 4,436,710 A | * | 3/1984 | Miyazaki et al. ............ 423/552 |
| 4,588,573 A | | 5/1986 | Worthington et al. |
| 6,676,917 B2 | | 1/2004 | Cabello-Fuentes |
| 6,767,528 B2 | | 7/2004 | Stauffer |

FOREIGN PATENT DOCUMENTS

| | | |
|---|---|---|
| GB | 363347 | 12/1931 |
| GB | 411820 | 6/1934 |
| GR | 1003839 | 3/2002 |

OTHER PUBLICATIONS

Chem. Abstracts, Acc. No. 55:6084, Lepeshkov et al., abstract of article from Zhurnal Neorganicheskoi Khimii(1958) 3,2395-407.

Search report from PCT/IL2008/000813, mailed Nov. 12, 2008.

Chem. Abstracts, Acc. No. 137:316518, Zhao et al., abstract of article from Haihuyan Yu Huagong, 31(4):1-4 (2002).

* cited by examiner

US 7,887,776 B2

CHEMICAL PROCESS TO PRODUCE HYDROGEN CHLORIDE AND CHLORIDE-FREE COMPOUND POTASSIUM SULFATE FERTILIZERS OR OTHER METAL SULFATES

This is a 35 U.S.C. §371 application of PCT/IL2008/000813, filed Jun. 15, 2008, and claims the benefit under 35 U.S.C. §120 of said PCT application, and further claims the benefit under 35 U.S.C. §119(e) of U.S. Provisional Patent Application U.S. Ser. No. 60/951,762, filed Jul. 25, 2007. The contents of these priority applications are incorporated herein by reference.

TECHNICAL FIELD

The present invention relates to methods for producing hydrogen chloride and metal sulfates from metal chlorides, in particular an improved process for producing metal sulfates and hydrogen chloride from the reaction of metal salts with oleum.

BACKGROUND ART

The most common industrial process for producing hydrogen chloride and sodium or potassium sulfate uses the reaction of sodium or potassium chloride with sulfuric acid at elevated temperatures (typically 500-840° C.) and is known as the Mannheim process (illustrated schematically in FIG. 1). Because of the high temperature at which the reaction is run, the Mannheim process is energy inefficient, using approximately half a barrel of oil per tonne of sulfate. Furthermore, the sulfate produced by the Mannheim process typically contains several percent of chloride impurities, while the HCl is emitted as a low-concentration (~10%) mixture in combination with combustion gases. This low-concentration HCl can be converted to aqueous hydrochloric acid (typically 30-33% HCl) in an additional process.

Several attempts to provide improved versions of the Mannheim process are known. For example, a modified Mannheim process is disclosed in U.S. Pat. No. 4,342,737. In the invention disclosed in this patent, KCl is reacted with sulfuric acid at an equivalent ratio of 1.07-1.40 at temperatures from 250-500° C. While this process does provide sulfate containing less chlorine than that produced by the Mannheim process, it is still energy-intensive, requiring continuous heating to work.

U.S. Pat. No. 4,588,573 discloses an alternative approach to the production of potassium sulfate. This invention uses the wet reaction between KCl and $H_2SO_4$ to produce $KHSO_4$; that is, the exothermicity of the reaction forming HCl is not sufficient to drive the formation of potassium sulfate ($K_2SO_4$) to completion. This invention further teaches dissolving the $KHSO_4$ in water followed by precipitation to form a potassium hydrogen sulfate double salt, $K_3H(SO_4)_2$, which represents three-fourths completion of the reaction to form $K_2SO_4$. The double salt is then filtered and again dissolved in water to form potassium sulfate. This process is not economical for industrial implementation, as it requires large quantities of water for the formation of the potassium sulfate, and large quantities of energy to evaporate the water in which the eventual product is dissolved.

U.S. Pat. No. 6,676,917 discloses a further process for production of HCl and neutralized sulfates. In this process, metal chloride reacts with sulfuric acid to yield a solution of $KHSO_4$ in sulfuric acid. After evaporation of HCl, this solution is then neutralized either with $NH_3$ to form $K(NH_4)SO_4$ or with potassium carbonate ($K_2CO_3$) to form $K_2SO_4$. This process is also impractical for commercial implementation, since it involves a tremendous waste of sulfuric acid, and the $K_2CO_3$ used as the neutralizing reagent is more expensive than the $K_2SO_4$ product of the process.

A fourth variation on the process is disclosed in U.S. Pat. No. 6,767,528. In the method disclosed in this patent, an approximately 1:1 mixture of metal chloride and $H_2SO_4$ is used to produce HCl. Reaction takes place in a rotary kiln kept at 550-600° C., and a counterflow between the gaseous components of the system and the solids is used to produce chloride-free sulfate. Again, the major disadvantage of this process is the large energy requirement. As with the Mannheim process, the HCl produced by this method is relatively impure, and in order to produce pure anhydrous HCl suitable for chlorination reactions, additional process steps are needed.

Finally, Greek Pat. No. 1003839 discloses a method for formation of $K_2SO_4$ via the reaction of a metal chloride with a mixture of concentrated $H_2SO_4$ and $H_2SO_4 \cdot 0.2SO_3$. The addition of $H_2SO_4 \cdot 0.2SO_3$ to the reaction mixture was performed to limit corrosion of the apparatus rather than for any benefit it would have on the reaction chemistry of the method. This method has several disadvantages as well. First of all, it is only adapted for use with KCl, and cannot be used with any other metal chloride as starting material (to produce the corresponding sulfate). Since the reaction mixture does not provide sufficient heat to sustain the reaction, the method also involves heating of the reactants, and hence suffers from the same energy inefficiency as the above-listed processes. Furthermore, the process does not produce $K_2SO_4$ directly (the product is obtained only after the aforementioned additional heating), nor does it produce a double salt.

Thus, there is a long-felt need for a process that is economical (including costs of start-up, production, and maintenance) and energy efficient for production of chloride-free metal sulfate and pure anhydrous HCl using a metal chloride salt as the starting material. The present invention discloses a method for doing so in which the metal chloride salt reacts with oleum in which the reactants are maintained at ambient temperature, and the supernatant liquid from the resulting sulfate salt solution is returned to the reactor, the exothermicity of the reaction between this liquid and the oleum being sufficient to drive the reaction without any need of additional heating; since there is no combustion, there are no combustion gases to dilute the discharged HCl.

DISCLOSURE OF INVENTION

It is therefore an object of this invention to disclose an adiabatic process for the manufacture of hydrogen chloride and metal sulfate, said process comprising the steps of (a) obtaining oleum; (b) obtaining a metal chloride; (c) obtaining water; (d) mixing predetermined quantities of (1) said metal chloride, (2) said oleum, and (3) a water-containing liquid, such that formation of gaseous HCl and a sulfate-containing solution occurs; (e) discharging said gaseous HCl from said mixture; (f) discharging said sulfate-containing solution from said mixture; (g) cooling said sulfate-containing solution to a temperature from about 10° C. to about 50° C. such that precipitation of a sulfate salt occurs; (h) separating solid produced by said precipitation from the supernatant liquid; (i) washing said solid with water; and, (j) repeating steps (d) through (i). It is in the essence of the invention wherein said hydrogen chloride and said sulfate salt are formed without any necessity for an external source of heat.

It is a further object of this invention to provide such a process, wherein the step of mixing predetermined quantities of said metal chloride, oleum, and water takes place in a reactor.

It is a further object of this invention to provide such a process, further comprising the additional step of transferring said sulfate-containing solution to a separate cooling chamber, wherein said step of cooling said sulfate-containing solution to a temperature from about 10° C. to about 50° C. such that precipitation of a sulfate salt occurs in said cooling chamber.

It is a further object of this invention to provide such a process, further comprising the additional step of transferring the contents of said cooling chamber to a separate decanter, wherein the step of separating said solid produced by said precipitation from said supernatant liquid occurs in said decanter.

It is a further object of this invention to provide such a process, in which said water-containing liquid is chosen from the group consisting of (a) water; (b) said water used to wash said solid; (c) said supernatant liquid; (d) a mixture of predetermined quantities of said supernatant liquid and said water used to wash said solid; (e) any combination of the above.

It is a further object of this invention to provide such a process, further comprising the additional steps of (a) cooling said gaseous HCl; and (b) scrubbing said gaseous HCl.

It is a further object of this invention to provide such a process, further comprising the additional step of transferring said gaseous HCl to a scrubber, wherein said cooling and scrubbing of said gaseous HCl take place in said scrubber.

It is a further object of this invention to provide such a process, further comprising the additional step of transferring a predetermined quantity of said supernatant liquid to said scrubber, wherein said supernatant liquid is used to cool and to scrub said gaseous HCl.

It is a further object of this invention to provide such a process, wherein said HCl discharged from the scrubber is obtained in a concentration of greater than about 90%.

It is a further object of this invention to provide such a process, further comprising the additional step of transferring said supernatant liquid and/or said water used to wash said solid to a reservoir.

It is a further object of this invention to provide such a process, further comprising the additional step of replacing water consumed or lost during said process with water drawn from said water used to wash said solid.

It is a further object of this invention to provide such a process, further comprising the additional steps of (a) adding a predetermined quantity of at least one neutralizing agent to said sulfate-containing solution and/or said solid; and (b) reacting said at least one neutralizing agent with said sulfate-containing solution and/or said solid.

It is a further object of this invention to provide such a process, further comprising the additional step of transferring said sulfate-containing solution and/or said solid to a plurality of neutralization chambers prior to addition of said at least one neutralizing agent.

It is a further object of this invention to provide such a process, further comprising the additional step of drying said sulfate salt.

It is a further object of this invention to provide such a process, wherein said step of drying said sulfate salt comprises (a) obtaining a drying oven; (b) introducing said sulfate salt into said drying oven; (c) heating said sulfate salt in said drying oven until a predetermined amount of water is driven off.

It is a further object of this invention to provide such a process wherein said predetermined amount of water driven off is the amount of water driven off such that no further decrease in the weight of the remaining solid is observed.

It is a further object of this invention to provide such a process, wherein the concentration of free $SO_3$ in said oleum is in the range of from about 5% to about 80%.

It is a further object of this invention to provide such a process, wherein the concentration of free $SO_3$ in said oleum is in the range of from about 25% to about 50%.

It is a further object of this invention to provide such a process, wherein said oleum is fed to said reactor below the level of the surface of the liquid in said reactor.

It is a further object of this invention to provide such a process, wherein said metal chloride, oleum, and water-containing liquid are fed to said reactor in a continuous stream.

It is a further object of this invention to provide such a process, wherein said reaction is conducted for about 2 minutes.

It is a further object of this invention to provide such a process, further comprising the additional steps of (a) obtaining steam; and (b) feeding said steam into said reactor at a level below the level of the surface of the liquid in said reactor.

It is a further object of this invention to provide such a process, wherein the metal chloride is chosen from the group consisting of (a) KCl, (b) NaCl, (c) $MgCl_2$.

It is a further object of this invention to provide such a process, in which said metal chloride is chosen from the group consisting of (a) NaCl, (b) KCl, (c) $MgCl_2$, and said neutralizing agent is chosen from the group consisting of (a) $NH_3$, (b) MgO, (c) $MgCO_3$, (d) dolomite, (e) KOH.

It is a further object of this invention to provide such a process, wherein said metal chloride is KCl and said sulfate salt is $K_3H(SO_4)_2$.

It is a further object of this invention to provide such a process, wherein said metal chloride is NaCl and said sulfate salt is $Na_2SO_4$.

It is a further object of this invention to provide such a process, wherein said metal chloride is $MgCl_2$ and said sulfate salt is $MgSO_4$.

It is a further object of this invention to provide such a process, wherein said metal chloride is a Group 1 metal chloride, and further wherein the $H^+:M^+$ ratio within said reactor is not less than about 0.98 and not more than about 1.15.

It is a further object of this invention to provide such a process, wherein said metal chloride is a Group 2 metal chloride, and further wherein the $H^+:M^{2+}$ ratio within said reactor is not less than about 1.96 and not more than about 2.30.

It is a further object of this invention to provide such a process, wherein the $H_2O$ concentration in said reactor is kept within the range of not less than about 5% and not more than about 40% by weight.

It is a further object of this invention to provide such a process, wherein the $H_2O$ concentration in said reactor is kept within the range of not less than about 10% and not more than about 30%.

It is a further object of this invention to provide potassium-ammonium sulfate double salt of empirical formula $K_3(NH_4)(SO_4)_2 \cdot xH_2O$ ($x \geq 0$).

It is a further object of this invention to provide a process specially adapted for manufacturing $K_3(NH_4)(SO_4)_2$, in which said metal chloride is KCl, said neutralizing agent is $NH_3$.

It is a further object of this invention to provide such a process specially adapted for manufacturing dry $K_3(NH_4)$ (SO$_4$)$_2$, in which said metal chloride is KCl, said neutralizing agent is NH$_3$, and further comprising the additional steps of (a) introducing said sulfate-containing salt into a drying oven and (b) drying said sulfate-containing salt until the measured weight ceases to decrease.

It is a further object of this invention to provide a potassium-magnesium sulfate double salt of empirical formula 3K$_2$SO$_4$·MgSO$_4$·xH$_2$O (x≧0).

It is a further object of this invention to provide a process specially adapted for manufacturing 3K$_2$SO$_4$·MgSO$_4$·xH$_2$O (x≧0), in which said metal chloride is KCl, said neutralizing agent is selected from the group consisting of (a) MgO and (b) MgCO$_3$.

It is a further object of this invention to provide a process specially adapted for manufacturing dry 3K$_2$SO$_4$·MgSO$_4$, in which said metal chloride is KCl, said neutralizing agent is selected from the group consisting of (a) MgO and (b) MgCO$_3$, and further comprising the additional steps of (a) introducing said sulfate-containing salt into a drying oven and (b) drying said sulfate-containing salt until the measured weight ceases to decrease.

It is a further object of this invention to provide a potassium-calcium-magnesium sulfate triple salt of empirical formula 3K$_2$SO$_4$·Ca$_n$Mg$_{1-n}$SO$_4$·xH$_2$O (x≧0).

It is a further object of this invention to provide a process specially adapted for manufacturing 3K$_2$SO$_4$·Ca$_n$Mg$_{1-n}$SO$_4$·xH$_2$O (x≧0), in which said metal chloride is KCl, and said neutralizing agent is dolomite.

It is a further object of this invention to provide a process specially adapted for manufacturing dry 3K$_2$SO$_4$·Ca$_n$Mg$_{1-n}$SO$_4$, in which said metal chloride is KCl, said neutralizing agent is dolomite, and further comprising the additional steps of (a) introducing said sulfate-containing salt into a drying oven and (b) drying said sulfate-containing salt until the measured weight ceases to decrease.

It is a further object of this invention to provide an apparatus for the adiabatic production of a sulfate-containing salt and HCl from a metal chloride and oleum, comprising: (a) a reactor; (b) means for introducing oleum into said reactor; (c) means for introducing a metal chloride into said reactor; (d) means for introducing a water-containing liquid into said reactor; (e) means for discharging corrosive gaseous products from said reactor; (f) means for discharging liquid from said reactor; (g) at least one decanter; (h) means for transferring material from said reactor to said decanter; (i) means for discharging supernatant liquid from said decanter; and (j) means for introducing water into said decanter; (k) means for using said water to wash the solid remaining in said decanter subsequent to discharge of supernatant liquid from said decanter. It is within the essence of the invention wherein chemical reaction between said metal chloride and said oleum to form HCl and a sulfate-containing solution occurs without any necessity for additional heating.

It is a further object of this invention to provide such an apparatus, further comprising (a) a cooling chamber; (b) means for transferring material from said reactor to said cooling chamber; and (c) means for transferring material from said cooling chamber to said decanter.

It is a further object of this invention to provide such an apparatus, wherein said means for introducing oleum into said reactor are adapted to introduce said oleum below the surface of the liquid in the reactor.

It is a further object of this invention to provide such an apparatus, additionally comprising means for introducing steam into said reactor, said means being adapted to introduce said steam at a level below the level of the surface of the liquid present in the reactor.

It is a further object of this invention to provide such an apparatus, additionally comprising means for transferring said supernatant liquid from said decanter to said reactor.

It is a further object of this invention to provide such an apparatus, additionally comprising (a) a reservoir for collecting said supernatant liquid; (b) means for transferring said supernatant liquid from said decanter to said reservoir; and (c) means for transferring said supernatant liquid from said reservoir to said reactor.

It is a further object of this invention to provide such an apparatus, additionally comprising (a) at least one scrubber adapted for cooling and scrubbing impure HCl gas; (b) means for transferring HCl gas discharged from said reactor to said scrubber; and (c) means for cooling and scrubbing said HCl gas within said scrubber.

It is a further object of this invention to provide such an apparatus, additionally comprising means for transferring a predetermined quantity of said supernatant liquid from said decanter and/or said reservoir to said scrubber and means for transferring said supernatant liquid from said scrubber to said reactor.

It is a further object of this invention to provide such an apparatus, additionally comprising means for transferring a predetermined quantity of said water used for washing said solid remaining in said decanter to said reactor and/or said scrubber and/or said cooling chamber, said means for transferring said predetermined quantity of said water adapted for replacing any water consumed or lost during the use of said apparatus.

It is a further object of this invention to provide such an apparatus, additionally comprising (a) a plurality of neutralization chambers; (b) means for transferring a predetermined quantity of material from said decanter to said plurality of neutralization chambers; (c) means for introducing a predetermined quantity of water into said plurality of neutralization chambers; (d) means for introducing and a plurality of neutralizing agents into said plurality of neutralization chambers; (e) means for separating (i) the product and/or products of chemical reaction between said plurality of neutralizing agents and said material transferred from said decanter from (ii) the remaining solution; and (f) means for recycling said remaining solution to said plurality of neutralization chambers.

MODES FOR CARRYING OUT THE INVENTION

Figure 1:
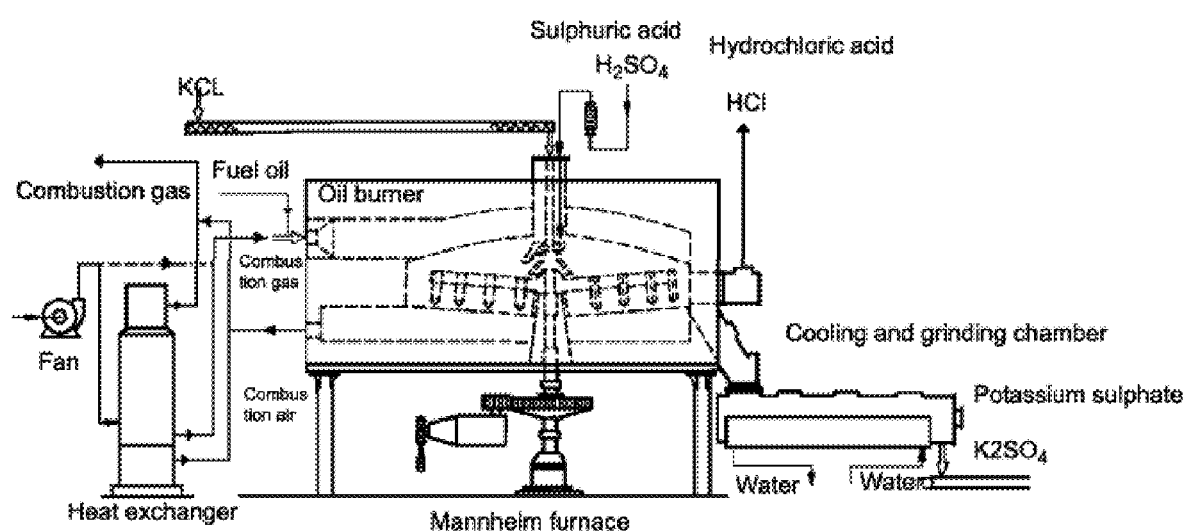
FIG. 1 shows a schematic diagram of the Mannheim process (taken from Koskinen, P., *Decision-making process on field technology for process management*, Ph. D. dissertation, Univ. Oulu Faculty of Technology, 2000, http://herkules.oulu.fi/isbn9514257855/html/chapter8_4.html).

It will be apparent to one skilled in the art that there are several embodiments of the invention that differ in details of construction, without affecting the essential nature thereof, and therefore the invention is not limited by that which is illustrated in the figures and described in the specification, but only as indicated in the accompanying claims, with the proper scope determined only by the broadest interpretation of said claims.

As used hereinafter, the term "oleum" refers to a solution or mixture concentrated $H_2SO_4$ containing excess $SO_3$, whether the $SO_3$ is present in the form of dissolved gas or bound to molecules of $H_2SO_4$ (e.g. as $H_2S_2O_7$); the "$SO_3$ content" of any given sample of oleum is defined by treating all $SO_3$ as free dissolved gas.

As used hereinafter, the term "ambient temperature" refers to the temperature at which a substance is kept in storage. This temperature may be room temperature or below (the latter in the case of a substance that must be stored at low temperature due to safety or stability concerns). The term indicates that the substance is taken from storage and used without being heated to a temperature above that of the environment in which the overall process takes place.

As used hereinafter, the term "reactor" refers to any container or vessel in which a chemical reaction takes place.

As used hereinafter, the term "decanter" refers to any container or vessel designed to separate a suspension of a solid in a liquid into at least one solid component and at least one liquid component.

As used hereinafter, the term "reservoir" refers to any container or vessel in which a liquid is stored.

As used hereinafter, the term "sulfate-containing solution" refers to any solution that contains, or can be presumed to contain, sulfate ion and at least one counterion, regardless of the presence or absence of other species in the same solution.

As used hereinafter, the term "sulfate salt" refers to any salt that contains sulfate ion, without reference to the number of types of cation it contains; thus, double salts are considered "sulfate salts" by this definition. In addition, the term is used without reference to or implication of any particular degree of hydration. As used hereinafter, the terms "dry sulfate salt" and "anhydrous sulfate salt" refer to said salt after it has undergone a drying process to the point that the weight of the remaining solid does not decrease any further under the conditions of the drying process used. Thus, "dry" and "anhydrous" refer to a salt from which the maximum amount of water has been driven off under the conditions under which the process is run, and not necessarily to a salt that is completely free of water of crystallization.

As used hereinafter, the term "scrubbing" refers to any process by which impurities (including, but not necessarily limited to, dust, water vapor, and $H_2SO_4$) are removed from a gaseous product of a chemical reaction. As used hereinafter, the term "scrubber" refers to any chamber or enclosed volume in which said scrubbing takes place; the use of the term does not exclude the possibility that other processes may occur in the same chamber or volume prior to, contemporaneously with, or subsequent to, said scrubbing.

As used hereinafter, the term "precipitation" refers generically to any process by which a solid is precipitated from a supersaturated solution, regardless of the form of the resulting solid (amorphous, crystalline, etc.).

As used hereinafter, the term "supernatant liquid" refers to liquid standing above a solid, e.g., the liquid standing above a solid after a precipitation has been performed. "Supernatant liquid" is also used to refer to said liquid even if it has been separated from the solid, until such time as the supernatant liquid is mixed with another liquid.

As used hereinafter, the term "Group 1 metal chloride" refers to a salt of the general formula MCl, in which M is one of Li, Na, K, Rb, Cs, or Fr.

As used hereinafter, the term "Group 2 metal chloride" refers to a salt of the general formula $MCl_2$, in which M is one of Be, Mg, Ca, Sr, Ba, or Ra.

As used hereinafter, any reference to the concentration of "$H^+$" refers to the molar concentration of ionizable hydrogen present, regardless of whether said hydrogen is in fact present as the free, hydrated, or otherwise complexed ion (e.g. each mole of $H_2SO_4$ present is considered to provide 2 moles of $H^+$). Similarly, as used hereinafter, any reference to the concentration of a metal ion refers to the total molar concentration of said metal present (i.e. it is calculated under the assumption of complete ionization); furthermore, the term "$M^{n+}$" is taken to include both the free and the solvated ion.

In a preferred embodiment of the present invention, predetermined quantities of oleum, a metal chloride, and a water-containing liquid are mixed together at ambient temperature. The reaction between the oleum and the water-containing liquid is sufficiently exothermic to drive chemical reaction between the metal chloride and the oleum without any necessity for additional heating of the reaction mixture; the temperature of the reaction mixture typically rises to about 120° C. The products of the chemical reaction between the metal chloride and the oleum are HCl and a sulfate salt, the latter of which remains in solution. The particular sulfate salt formed will depend on the particular metal chloride used, as detailed below. The gaseous HCl is then discharged from or escapes from the mixture, where it can be collected for further treatment. The sulfate-containing solution is discharged from the reaction mixture as well (in a preferred embodiment, into a separate cooling chamber), whereupon it is cooled to a temperature from about 10° C. to about 50° C., such that precipitation of a sulfate salt from the solution occurs. In a preferred embodiment of the invention, the slurry is then transferred to a decanter, in which the solid produced by the precipitation is separated from the supernatant liquid, and then washed with water. In additional embodiments, cooling of the solution, precipitation of said sulfate salt, and separation of the solid and liquid components after precipitation of said sulfate salt can be performed in a single chamber. The entire process is then repeated cyclically.

In a preferred embodiment of the invention, the $SO_3$ concentration (as free $SO_3$) of the oleum is between about 25% and about 50%. In additional embodiments, the $SO_3$ concentration (as free $SO_3$) of the oleum is between about 5% (below this amount, the reaction between the water-containing liquid and the oleum is not sufficiently exothermic to drive the reaction) and about 80% (above this amount, too much heat is generated for efficient operation). In the best mode of operation of the process, the oleum is added to the reaction mixture below the level of the liquid already present in order to prevent formation of undesirable (and dangerous) $H_2SO_4$ mist.

In an additional embodiment of the invention, the mixing of said predetermined quantities of metal chloride, oleum, and water-containing liquid takes place in a reactor designed for the process. The details of the construction of the reactor will depend on the circumstances of its use (e.g. which of the possible embodiments of the invention is to be used, the quantity of material to be produced, etc.), but will be obvious to one skilled in the art. In the best mode of operation of the invention, the $H_2O$ concentration in the reactor is kept between about 10% and about 30%. In other embodiments, the $H_2O$ concentration in the reactor is kept between about 5% and about 40%, as too low an $H_2O$ concentration in the reactor will lead to too high a concentration of $H_2SO_4$ in the HCl gas discharged from the reactor, while too high an $H_2O$ concentration in the reactor will lead to too high an $H_2O$ concentration in the HCl gas discharged from the reactor. In additional embodiments of the invention, as a safeguard against the amount of heat emitted during the reaction decreasing, due, e.g., to the $SO_3$ concentration of the oleum falling below the minimum level described above, the invention includes the additional steps of (a) obtaining steam; and (b) introducing said steam into said reactor below the level of the surface of the liquid in said reactor.

Since the formation of the sulfate salt is driven by the exothermicity of the reaction of the water-containing liquid with the oleum, in the initial mixture (prior to any reaction), said water-containing liquid will necessarily be water. In various additional embodiments, said water-containing liquid may vary in subsequent cycles of the process. In particular, in a preferred embodiment of the invention, a predetermined quantity of supernatant liquid from the precipitation is recycled into said reactor and this recycled supernatant liquid serves as the water-containing liquid. This recycling provides a more efficient process overall than, e.g., using water drawn from an external source, both because the overall water usage of the process will be lowered, and because in this embodiment, sulfate is recycled as well, increasing the efficiency of the precipitation in subsequent cycles. In various additional embodiments of the invention, the water-containing liquid mixed with metal chloride and oleum in subsequent reaction cycles is chosen from the group consisting of (a) water; (b) the water used to wash the solid deposited during the precipitation step; (c) the supernatant liquid from the precipitation step; (d) a mixture of predetermined quantities of said supernatant liquid and said water to wash said solid; (e) any combination of the above. In an additional embodiment of the invention, said supernatant liquid and/or said water used to wash said solid are transferred to a reservoir, and then transferred to said reactor as needed. In additional embodiments of the invention, further efficiency in water usage is achieved by recycling the water used to wash the solid precipitated from the mixture to replace any water consumed or lost (e.g. due to leaks, contained in the HCl discharged from the reaction mixture, etc.) during the process.

In additional embodiments of the invention, the gaseous HCl that is discharged from the reaction mixture undergoes further treatment. In particular, it is cooled and then scrubbed. In a preferred embodiment of the invention, this cooling and scrubbing takes place in a scrubber, using technology well known in prior art. In some embodiments of the invention, said scrubbing is performed by transferring a predetermined quantity of said supernatant liquid to said scrubber, and using said supernatant liquid to scrub said HCl. In other embodiments, concentrated $H_2SO_4$ may be used instead of or in addition to said supernatant liquid, according to methods well known in the prior art. The anhydrous HCl discharged from the scrubber is of sufficient purity that it can be used for processes that require a source of high-purity anhydrous HCl, such as oxychlorination reactions, production of ethylene dichloride, formation of aqueous hydrochloric acid, etc. In a preferred embodiment of the invention, said HCl discharged from the scrubber is obtained in a concentration of greater than about 90%.

As described in detail below, the sulfate salt that is obtained by the process as described above is in some cases an acid salt. Thus, in additional embodiments of the invention, the sulfate salt obtained is further treated by addition of at least one neutralizing agent and reacting the acid salt (solid or solution) with said at least one neutralizing agent. In a preferred embodiment of the invention, said sulfate salt is transferred to a plurality of neutralization chambers prior to the addition of said neutralizing reagent or reagents. Each neutralization chamber is adapted for use with the specific neutralizing agent used; e.g. any particular neutralization chamber can be adapted for use with a gaseous neutralizing agent (e.g. gaseous $NH_3$, etc.), a liquid neutralizing agent (e.g. liquid $NH_3$, aqueous $NH_3$, etc.), or a solid neutralizing agent (e.g. MgO, $MgCO_3$, etc.), according to the needs of the user. Containers and reactors adapted for such substances are well known in the prior art.

Because the thermodynamic driving force of the chemical reaction is the exothermicity of the addition of water-containing liquid to the reaction mixture, the reaction can be run as long as the reaction mixture continues to be fed into the reactor. Thus, in a preferred embodiment of the invention, the process is run continuously, that is to say, said metal chloride, oleum and water-containing liquid are fed into the reactor in a continuous stream. Furthermore, because of the efficiency of the process disclosed in the present invention, the reaction is rapid, so in various embodiments of the invention, the reaction is conducted for about 2 minutes before the reaction products are discharged from the reactor.

In specific embodiments in which said metal chloride is KCl, the sulfate salt produced in the reaction between KCl and oleum is the acid double salt $K_3H(SO_4)_2$ produced according to the chemical reaction

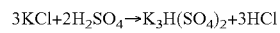
$$3KCl + 2H_2SO_4 \rightarrow K_3H(SO_4)_2 + 3HCl$$

That is, under these conditions, formation of potassium sulfate goes only 75% to completion due to the relatively high enthalpy of formation of potassium sulfate. In embodiments of the invention that include further steps of neutralization of the acid salt remaining after precipitation, specific neutralizing agents are used. In particular, the neutralizing agent is chosen from the group consisting of (a) $NH_3$ (gaseous, liquid, or aqueous); (b) MgO; (c) $MgCO_3$; (d) dolomite; (e) KOH. Neutralization proceeds according to the following reactions:

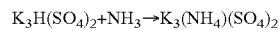
$$K_3H(SO_4)_2 + NH_3 \rightarrow K_3(NH_4)(SO_4)_2$$

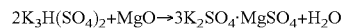
$$2K_3H(SO_4)_2 + MgO \rightarrow 3K_2SO_4 \cdot MgSO_4 + H_2O$$

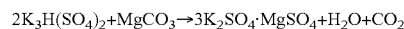
$$2K_3H(SO_4)_2 + MgCO_3 \rightarrow 3K_2SO_4 \cdot MgSO_4 + H_2O + CO_2$$

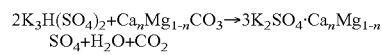
$$2K_3H(SO_4)_2 + Ca_nMg_{1-n}CO_3 \rightarrow 3K_2SO_4 \cdot Ca_nMg_{1-n}SO_4 + H_2O + CO_2$$

$$K_3H(SO_4)_2 + KOH \rightarrow 2K_2SO_4 + H_2O$$

In the cases where the neutralizing agent is $NH_3$, MgO, $MgCO_3$, or dolomite, the product of the neutralization is a hitherto unknown double salt.

In specific embodiments in which said metal chloride is NaCl or $MgCl_2$, formation of sulfate can go to completion according to the following chemical reactions:

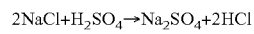
$$2NaCl + H_2SO_4 \rightarrow Na_2SO_4 + 2HCl$$

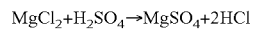
$$MgCl_2 + H_2SO_4 \rightarrow MgSO_4 + 2HCl$$

Note that in all cases listed above, the chemical equations as written ignore any water of crystallization; thus, more accurate formulations of the empirical formulas of these novel double salts would be (1) $K_3(NH_4)(SO_4)_2 \cdot xH_2O$; (1) $3K_2SO_4 \cdot MgSO_4 \cdot xH_2O$; (2) $3K_2SO_4 \cdot Ca_nMg_{1-n}SO_4 \cdot xH_2O$.

Additional embodiments of the present invention thus include processes specifically adapted for production of these three novel double salts. In particular, an embodiment in which said metal chloride is KCl and said neutralizing agent is $NH_3$ will produce $K_3(NH_4)(SO_4)_2 \cdot xH_2O$; an embodiment in which said metal chloride is KCl and said neutralizing agent is selected from the group consisting of (a) MgO and (b) $MgCO_3$ will produce $3K_2SO_4 \cdot MgSO_4 \cdot xH_2O$; and an embodiment in which said metal chloride is KCl and said neutralizing agent is dolomite ($Ca_nMg_{1-n}CO_3$) will produce $3K_2SO_4 \cdot Ca_nMg_{1-n}SO_4 \cdot xH_2O$. In the best modes of operation of the invention, the predetermined quantity of neutralizing agent is a slight stoichiometric excess (see the examples below).

As described above, one important need is a process that yields a metal sulfate product that has low chlorine content. The best modes of operation of the present invention are designed to yield the final sulfate product with a minimum chlorine content (<1.5%) and with a maximum overall yield. Thus, in embodiments in which said metal chloride is a Group 1 metal chloride, the $H^+:M^+$ (M=the metal) molar ratio in the reactor is preferably maintained at not less than about 0.98 and not more than about 1.15, since too low a ratio will yield a final product with too high a chlorine content, while too high a ratio will reduce the yield of the sulfate salt. For analogous reasons, in embodiments in which said metal chloride is a Group 2 metal chloride, the $H^+:M^{2+}$ molar ratio is preferably maintained at not less than about 1.96 and not more than about 2.3.

Figure 2:
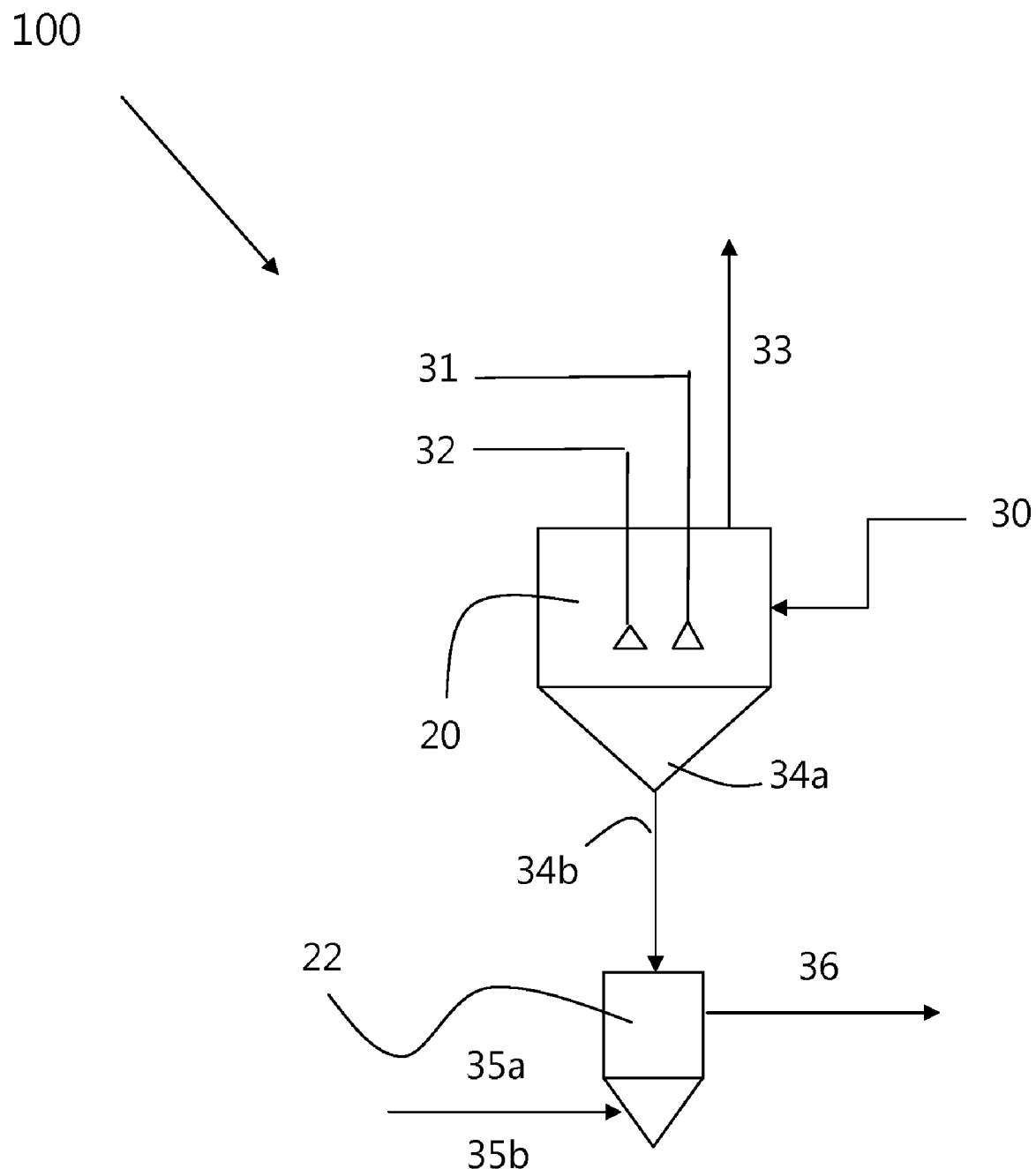
FIG. 2 shows a schematic diagram of one embodiment of the apparatus disclosed in the present invention.

The present invention also discloses an apparatus for the production of a sulfate-containing salt and HCl from a metal chloride and oleum, wherein chemical reaction between said metal chloride and said oleum occurs without any necessity for additional heating. Reference is now made to FIG. 2, which shows schematically a preferred embodiment 100 of said apparatus. It is acknowledged in this respect that many of the individual components of the apparatus utilize technology known in prior art; it is in the essence of the present invention to disclose a combination of components that, when taken together, enable a unique process for the production of a metal sulfate salt and anhydrous HCl, the advantages of which have already been described above. In this embodiment, the apparatus comprises a reactor 20. Interconnected with said reactor are means for introducing a metal chloride into said reactor (30); means for introducing oleum into said reactor (31); and means for introducing a water-containing liquid into said reactor (32). Also interconnected with said reactor are means 33 for discharging gaseous products from said reactor and means for discharging liquid from said reactor 34*a*. The apparatus additionally comprises a decanter 22. A means for transferring liquid from said reactor to said decanter (34*b*) is interconnected at one end with the means for discharging liquid from said reactor and at the other with said decanter. Further interconnected with the decanter are means 36 for discharging supernatant liquid therefrom, means for introducing water into said decanter (35*a*), and means 35*b* for using said water to wash the solid remaining in said decanter subsequent to discharge of supernatant liquid from said decanter.

In an additional embodiment of the apparatus, said means for introducing oleum into the reactor are adapted to introduce said oleum at a level below the surface of the liquid present in the reactor. The advantage of this embodiment is that this means of introducing oleum into the reactor will limit the likelihood of formation of $H_2SO_4$ mist.

A further additional embodiment of the apparatus further comprises means for introducing steam into said reactor, said means adapted to introduce said steam at a level below the surface of the liquid present in the reactor. According to this embodiment, said steam is introduced into the reactor only in the event that the temperature of the reaction mixture is not high enough for efficient reaction to take place, e.g. if for some reason the $SO_3$ concentration of the oleum is too low.

Additional embodiments of the apparatus include means for recycling supernatant liquid from said decanter back to said reactor. Thus, one additional embodiment comprises, in addition to the components described for embodiment 100, means for transferring said supernatant liquid from said decanter to said reactor. A second additional embodiment of the apparatus further comprises (a) a reservoir for collecting said supernatant liquid; (b) means for transferring said supernatant liquid from said decanter to said reservoir; and (c) means for transferring said supernatant liquid from said reservoir to said reactor.

Further additional embodiments of the apparatus include means for treating HCl gas discharged from said reactor. Thus, one additional embodiment of the reactor additionally comprises (a) a scrubber adapted for cooling and scrubbing impure HCl gas; (b) means for transferring HCl gas discharged from said reactor to said scrubber; (c) means for cooling and scrubbing said HCl gas after its been introduction into said scrubber. In another additional embodiment of the invention herein disclosed, the reactor further comprises a means for transferring a predetermined quantity of said supernatant liquid from said decanter and/or said reservoir into said scrubber. In this embodiment, the supernatant liquid is used to scrub the HCl discharged from the reactor.

Additional embodiments of the apparatus include means for increasing the efficiency of its use of water. In particular, these embodiments, the apparatus additionally comprises means for transferring a predetermined quantity of said water used for washing said solid remaining in said decanter to said reactor and/or said scrubber and/or said cooler, as needed to replace any small quantities of water that may have been consumed or lost (e.g. due to leaks, carried out with the gaseous HCl, etc.) during the use of the apparatus.

Figure 3:
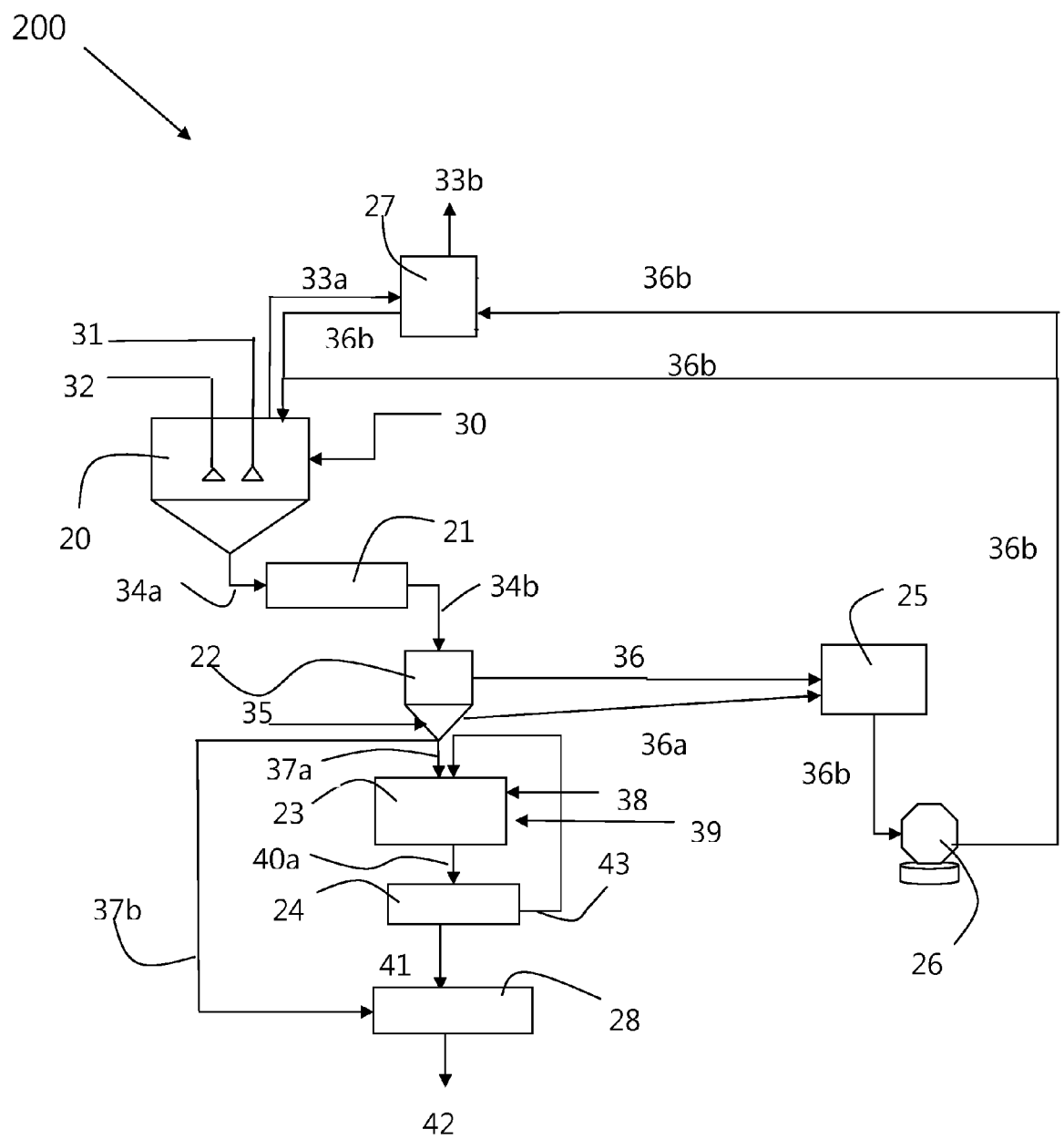
FIG. 3 shows a schematic diagram of a second embodiment of the apparatus disclosed in the present invention.

Reference is now made to FIG. 3, in which a preferred embodiment 200 is illustrated schematically. In this embodiment, the apparatus comprises a reactor 20. Interconnected with said reactor are means for introducing a metal chloride into said reactor (30); means for introducing oleum into said reactor (31); and means for introducing water into said reactor (32). Note that the means for introducing water into said reactor can easily be adapted for introducing steam as well. Also interconnected with said reactor are means 33*a* for discharging gaseous products from said reactor. Gas discharged from said reactor is introduced into a scrubber 27, where it is cooled and scrubbed. The scrubber is interconnected with means 33*b* for discharging the anhydrous HCl remaining after it has passed through the scrubber. In embodiment 200, the apparatus further comprises means for discharging liquid from said reactor 34*a*. The liquid discharged from the reactor is introduced into cooler 21. In the cooler, the solution is cooled to between about 10° C. and about 50° C. such that precipitation of a sulfate salt occurs. Means for transferring the slurry 34*b* are interconnected with said cooler at one end and with a decanter 22 at the other. In the decanter, separation of the slurry into solid sulfate salt and supernatant liquid occurs. The decanter is interconnected with a reservoir 25; supernatant liquid 36 is transferred from the decanter to the reservoir. The apparatus further comprises means for introducing water into the decanter (35) and for using this water to wash the solid remaining in the decanter after the supernatant liquid is transferred to the reservoir. In the embodiment illustrated in FIG. 3, this water (36*a*) is transferred to the reservoir as well. Means (26) (e.g. a pump) are provided for transferring the contents of the reservoir (36*b*) to the reactor and/or to the scrubber; after being used in the scrubber, the liquid is then transferred back to the reactor.

The embodiment of the apparatus illustrated in FIG. 3 further comprises means (37*a*) for transferring a predetermined quantity of the solid to a neutralization chamber 23. Means are also provided for introducing a predetermined quantity of a neutralizing agent of interest (38) and a predetermined quantity of water (39) into the neutralization chamber 23. Reaction between the solid sulfate salt and the neutralizing agent takes place in neutralization chamber 23. Means for discharging the products of the reaction from the neutralization chamber (40) are interconnected with the neutralization chamber at one end and a separator 24 at the other. In the separator, the (wet) neutralized sulfate salt product 41 is separated from any remaining solution (which solution may include unreacted neutralizing agent) and transferred to a drying oven 28. Means are also provided (43) for recycling said solution back to the neutralization chamber 23. Additionally, means (37b) are also provided for transferring a predetermined quantity of the solid directly from the decanter to the drying oven 28 in cases in which there is no need for neutralization of the solid.

Such drying ovens are well known in the prior art, and the specific capacity and temperature range will be chosen according to the specific needs of the user. In the examples given below, drying is performed at ~105° C., but other embodiments employing higher or lower drying temperatures, use of a vacuum oven, etc., are quite feasible. In the embodiment illustrated in FIG. 3, the degree of drying is measured empirically by the weight of the solid transferred to the drying oven; the salt is considered anhydrous at such time as its weight ceases to decrease, indicating that the maximum possible amount of water has been driven off. The final sulfate salt product 42 (containing any desired degree of residual hydration or moisture) is then collected from drying oven 28.

In an additional embodiment of the apparatus, the water used for washing the solid 36a in the decanter is transferred to reservoir 25. In an additional embodiment of the apparatus, this transfer occurs via the same channel that was used for the transfer of the supernatant liquid.

In additional embodiments of the apparatus, it comprises more than one neutralization chamber and separator. Each neutralization chamber can be adapted for use with a different neutralizing agent (e.g. a gas vs. a solid). In these embodiments, the solid discharged from the decanter can be transferred to any one of the neutralization chambers or divided among them.

EXAMPLES

The following examples are provided to illustrate best modes of operation of the invention herein disclosed.

Example 1

A water-containing liquid, typical of the supernatant liquid remaining after precipitation of a sulfate salt, was prepared by mixing 200 g $K_2SO_4$, 200 g $H_2SO_4$, and 600 g $H_2O$ for 3 hours. 548 g KCl were then dissolved in this water-containing ("supernatant") liquid.

673 g of oleum (31% free $SO_3$) was introduced via a pipe into the container containing this solution. HCl discharged from the reaction mixture was dissolved in 520 g $H_2O$; the total weight of the aqueous HCl solution thus obtained was 786 g. The HCl solution was found to contain 32% HCl and 0.5% $H_2SO_4$. The sulfate-containing solution obtained from the reaction mixture was then cooled to 35° C., whereupon precipitation of a sulfate-containing salt occurred. The crystals were separated by filtration from the supernatant liquid and then dried for 2 hours at ~105° C. The weight of the dry crystals was 340 g (44.7% yield). The resulting salt contained 34.2% K, compared with a theoretical value of 37.8% for pure $K_3H(SO_4)_2$, and 18.7% $H_2SO_4$, compared with a theoretical value of 15.8%. The product was also highly chlorine-free, containing only 0.3% Cl. These results are consistent with the primary reaction being $3KCl+2H_2SO_4 \rightarrow K_3H(SO_4)_2+3HCl$.

Example 2

100 g of the dry sulfate salt product of the previous example was further washed with 40 g of $H_2O$ in order to remove any remaining $H_2SO_4$. The solid was filtered under vacuum and then dried for 2 h at ~105° C. The washing did remove excess $H_2SO_4$; the resulting product contained 36.2% K and 16.7% $H_2SO_4$.

Example 3

In this experiment, the potassium sulfate double salt was neutralized with aqueous $NH_3$ according to the reaction

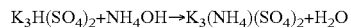

$$K_3H(SO_4)_2+NH_4OH \rightarrow K_3(NH_4)(SO_4)_2+H_2O$$

15 g of the washed and dried double salt from Example 2 were mixed for 1 h with 10 g of 25% $NH_4OH$. The precipitate was dried at ~105° C. for 2 h. The weight of the dry crystals was 15.64 g, and the crystals contained 4.42% N and 34.2% K (as compared to theoretical values of 4.3% N and 35.8% K).

What is claimed is:

1. A process for the production of hydrogen chloride and metal sulfate, comprising the steps of:
   mixing predetermined quantities of a metal chloride, oleum, and a water-containing liquid in a reaction vessel, such that formation of gaseous HCl and a sulfate-containing solution occurs;
   discharging said gaseous HCl from said reaction vessel;
   discharging said sulfate-containing solution from said reaction vessel;
   cooling said sulfate-containing solution to a temperature from about 10° C. to about 50° C. such that precipitation of a sulfate salt-containing solid occurs;
   separating said sulfate salt-containing solid from the supernatant liquid;
   washing said sulfate salt-containing solid with a predetermined quantity of water, whereby to obtain said metal sulfate;
   wherein said reaction vessel is not heated via an external heat source, said metal chloride is KCl, and said metal sulfate is $K_3H(SO_4)_2$; and,
   optionally, repeating said steps.

2. The process of claim 1, wherein the cooling of said sulfate-containing solution is conducted in a cooling chamber.

3. The process of claim 2, further comprising transferring the contents of said cooling chamber to a separate decanter, wherein said separating said solid produced by said precipitation from said supernatant liquid occurs in said decanter.

4. The process of claim 1, further comprising cooling said gaseous HCl and scrubbing said gaseous HCl.

5. The process of any of claim 4, wherein said gaseous HCl is obtained in a purity of greater than about 90%.

6. The process of claim 1, wherein the water used to wash the solid is recycled into the reaction vessel to replace water consumed or lost during said process.

7. The process of claim 1, further comprising reacting at least one neutralizing agent with said sulfate-containing solution and/or said solid.

8. The process of claim 7, wherein said metal chloride is chosen from the group consisting of (a) KCl, (b) NaCl, and (c)

$MgCl_2$, and said neutralizing agent is chosen from the group consisting of (a) $NH_3$, (b) MgO, (c) $MgCO_3$, (d) dolomite, and (e) KOH.

9. The process of claim 7, wherein said metal chloride is KCl, said neutralizing agent is $NH_3$, and said sulfate-containing salt is $K_3(NH_4)(SO_4)_2$, optionally further comprising drying said $K_3(NH_4)(SO_4)_2$ in a drying oven until the measured weight ceases to decrease.

10. The process of claim 7, wherein said metal chloride is KCl, said neutralizing agent is selected from the group consisting of MgO and $MgCO_3$, and said sulfate-containing salt is $3K_2SO_4 \cdot MgSO_4 \cdot xH_2O$ ($x \geqq 0$); and, when it is desired that $x=0$, optionally further comprising drying said $3K_2SO_4 \cdot MgSO_4 \cdot xH_2O$ in a drying oven until the measured weight ceases to decrease.

11. The process of claim 7, wherein said metal chloride is KCl, said neutralizing agent is dolomite, and said sulfate salt is $3K_2SO_4 \cdot Ca_n Mg_{1-n} SO_4 \cdot xH_2O$ ($x \geqq 0$); and, when it is desired that $x=0$, optionally further comprising drying said $3K_2SO_4 \cdot Ca_n Mg_{1-n} SO_4 \cdot xH_2O$ in a drying oven until the measured weight ceases to decrease.

12. The process of claim 1, further comprising the additional step of drying said sulfate salt.

13. The process of claim 1, wherein the concentration of free $SO_3$ in said oleum is in the range of from about 5% to about 25% and the oleum is preheated before being added to the reaction vessel.

14. The process of claim 1, wherein the concentration of free $SO_3$ in said oleum is in the range of from about 25% to about 80%.

15. The process of claim 1, wherein said oleum is fed to said reaction vessel below the level of the surface of the liquid in said reaction vessel.

16. The process of claim 1, wherein said metal chloride, oleum, and water-containing liquid are fed to said reaction vessel in continuous streams.

17. The process of claim 1, wherein said metal chloride is chosen from the group consisting of (a) KCl, (b) NaCl, and (c) $MgCl_2$.

18. The process of claim 1, wherein either (a) said metal chloride is a Group 1 metal chloride, and the $H^+:M^+$ molar ratio within said reaction vessel is not less than about 0.98 and not more than about 1.15, or (b) said metal chloride is a Group 2 metal chloride, and the $H^+:M^{2+}$ molar ratio within said reaction vessel is not less than about 1.96 and not more than about 2.3.

19. The process of claim 1, wherein the $H_2O$ concentration in said reaction vessel is kept within the range of not less than about 5% and not more than about 40%.

20. A sulfate-containing salt selected from the group consisting of (1) potassium-magnesium sulfate double salt of empirical formula $3K_2SO_4 \cdot MgSO_4 \cdot xH_2O$ ($x \geqq 0$) and (2) a potassium-calcium-magnesium sulfate triple salt of empirical formula $3K_2SO_4 \cdot Ca_n Mg_{1-n} SO_4 \cdot xH_2O$ ($x \geqq 0$).

* * * * *